(12) United States Patent
Chen et al.

(10) Patent No.: US 9,347,605 B2
(45) Date of Patent: May 24, 2016

(54) HANGING MODULE

(75) Inventors: Chih-Hsiung Chen, New Taipei (TW); Sheng-Hsiung Cheng, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 0 days.

(21) Appl. No.: 13/430,675

(22) Filed: Mar. 26, 2012

(65) Prior Publication Data

US 2012/0318943 A1   Dec. 20, 2012

(30) Foreign Application Priority Data

Jun. 17, 2011 (TW) .............................. 100121265 A

(51) Int. Cl.
| | |
|---|---|
| *A47F 5/00* | (2006.01) |
| *F16M 13/02* | (2006.01) |
| *F16M 11/10* | (2006.01) |
| *F16M 11/08* | (2006.01) |
| *F16M 11/20* | (2006.01) |
| *F16M 11/24* | (2006.01) |
| *A45D 19/04* | (2006.01) |
| *A47J 47/16* | (2006.01) |

(52) U.S. Cl.
CPC ............... *F16M 13/02* (2013.01); *F16M 11/08* (2013.01); *F16M 11/10* (2013.01); *F16M 11/2085* (2013.01); *F16M 11/24* (2013.01)

(58) Field of Classification Search
CPC ........ A47F 7/021; F16M 13/02; F16M 11/08; F16M 11/24; F16M 11/2085; F16M 11/10; A47G 29/08
USPC .......... 40/606.14, 606.15, 606.16; 211/133.4, 211/196, 205, 107; 248/176.1, 122.1, 121, 248/124.1, 125.1, 218.4, 295.11, 917–923; 361/679.04, 679.06, 679.21; 403/53, 403/54, 62, 63, 103, 106–108, 116; 52/698, 52/699, 700, 704, 710, 714, 364
See application file for complete search history.

(56) References Cited

U.S. PATENT DOCUMENTS

| | | | | |
|---|---|---|---|---|
| 6,086,033 | A  * | 7/2000 | Calleja ...................... | E05D 7/12 16/309 |
| 6,343,006 | B1 * | 1/2002 | Moscovitch ............ | B60R 11/02 348/794 |
| 7,529,083 | B2 * | 5/2009 | Jeong ................... | F16M 11/105 248/917 |
| 7,686,275 | B2 * | 3/2010 | Scarcello ................. | A47G 1/24 248/231.91 |

(Continued)

OTHER PUBLICATIONS

Office action mailed on Apr. 3, 2014 for the China application No. 201110189268.0, p. 3 line 4-31, p. 4-5 and p. 6 line 1-18.

*Primary Examiner* — Jonathan Liu
*Assistant Examiner* — Muhammad Ijaz
(74) *Attorney, Agent, or Firm* — Winston Hsu; Scott Margo

(57) ABSTRACT

A hanging module includes a first hanging mechanism. The first hanging mechanism includes first and second slot disks, first and second hook disks, a first sliding member, and a first guiding member. The first and second hook disks are disposed on first and second displayers respectively. A first hook of the first hook disk and a second hook of the second hook disk are used for hooking a first protruding slot of the first slot disk and a second protruding slot of the second slot disk respectively. The first sliding member has a first pivot portion and a first rod portion. The first guiding member has a second pivot portion and a first slot portion. The first and second pivot portions are pivoted onto the first and second protruding slots respectively. The first rod portion is slidably disposed in the first slot portion.

16 Claims, 4 Drawing Sheets

(56) References Cited

U.S. PATENT DOCUMENTS

| | | | | |
|---|---|---|---|---|
| 7,798,457 B2* | 9/2010 | Chih | F16M 11/10 | 248/274.1 |
| 7,984,889 B2* | 7/2011 | Whitley | F16M 11/06 | 248/221.11 |
| 8,083,189 B2* | 12/2011 | Sun | F16M 11/08 | 248/122.1 |
| 2007/0084978 A1* | 4/2007 | Martin | F16M 11/105 | 248/176.1 |
| 2007/0205340 A1* | 9/2007 | Jung | F16M 11/24 | 248/125.9 |
| 2008/0055832 A1* | 3/2008 | Ozolins | F16M 11/04 | 361/679.04 |
| 2008/0117578 A1* | 5/2008 | Moscovitch | F16M 11/10 | 361/679.04 |
| 2008/0225472 A1* | 9/2008 | Chih | F16M 11/10 | 361/679.04 |
| 2009/0090825 A1* | 4/2009 | Jung | G06F 1/1601 | 248/205.1 |
| 2009/0134285 A1* | 5/2009 | Huang | F16M 11/08 | 248/124.1 |
| 2010/0039758 A1* | 2/2010 | Ozolins | F16M 11/04 | 361/679.06 |
| 2010/0128423 A1* | 5/2010 | Moscovitch | F16M 11/04 | 361/679.01 |
| 2011/0043990 A1* | 2/2011 | Mickey | F16M 11/06 | 361/679.04 |
| 2013/0092805 A1* | 4/2013 | Funk | F16M 13/02 | 248/121 |
| 2013/0119210 A1* | 5/2013 | Moscovitch | F16M 11/043 | 248/122.1 |
| 2015/0060615 A1* | 3/2015 | Liu | F16M 11/10 | 248/125.7 |
| 2015/0131217 A1* | 5/2015 | Brandt | F16M 11/18 | 361/679.04 |

* cited by examiner

HANGING MODULE

BACKGROUND OF THE INVENTION

1. Field of the Invention

The present invention relates to a hanging module, and more specifically, to a hanging module capable of adjusting a relative angle and a distance between two adjacent displayers hung thereon.

2. Description of the Prior Art

A conventional hanging mechanism for hanging a display monitor onto a support wall includes a fixing member and a hanging frame. A common installation design involves screwing the fixing member onto a back side of a casing of the display monitor and then engaging the fixing member with the hanging frame after the hanging frame is screwed onto the support wall. Via the said engagement of the fixing member and the hanging frame, the display monitor can be hung on the support wall. However, in the prior art, the hanging mechanism does not have an angle adjusting function and a length adjusting function. Thus, configuration flexibility of the hanging mechanism is limited in hanging display monitors for forming a monitor wall.

SUMMARY OF THE INVENTION

The present invention provides a hanging module for hanging a first displayer and a second displayer. The hanging module includes a first slot disk, a first hook disk, a second slot disk, a second hook disk, a first sliding member, and a first guiding member. The first slot disk has at least one first protruding slot. The first hook disk is detachably disposed on the first displayer and has at least one first hook for hooking the first protruding slot. The second slot disk has at least one second protruding slot. The second hook disk is detachably disposed on the second displayer and has at least one second hook for hooking the second protruding slot. The first sliding member has a first pivot portion and a first rod portion. The first pivot portion is pivotally connected to the first protruding slot. The first guiding member has a second pivot portion and a first slot portion. The second pivot portion is pivotally connected to the second protruding slot. The first rod portion is slidably disposed in the first slot portion for adjusting a length of the first sliding member relative to the first guiding member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
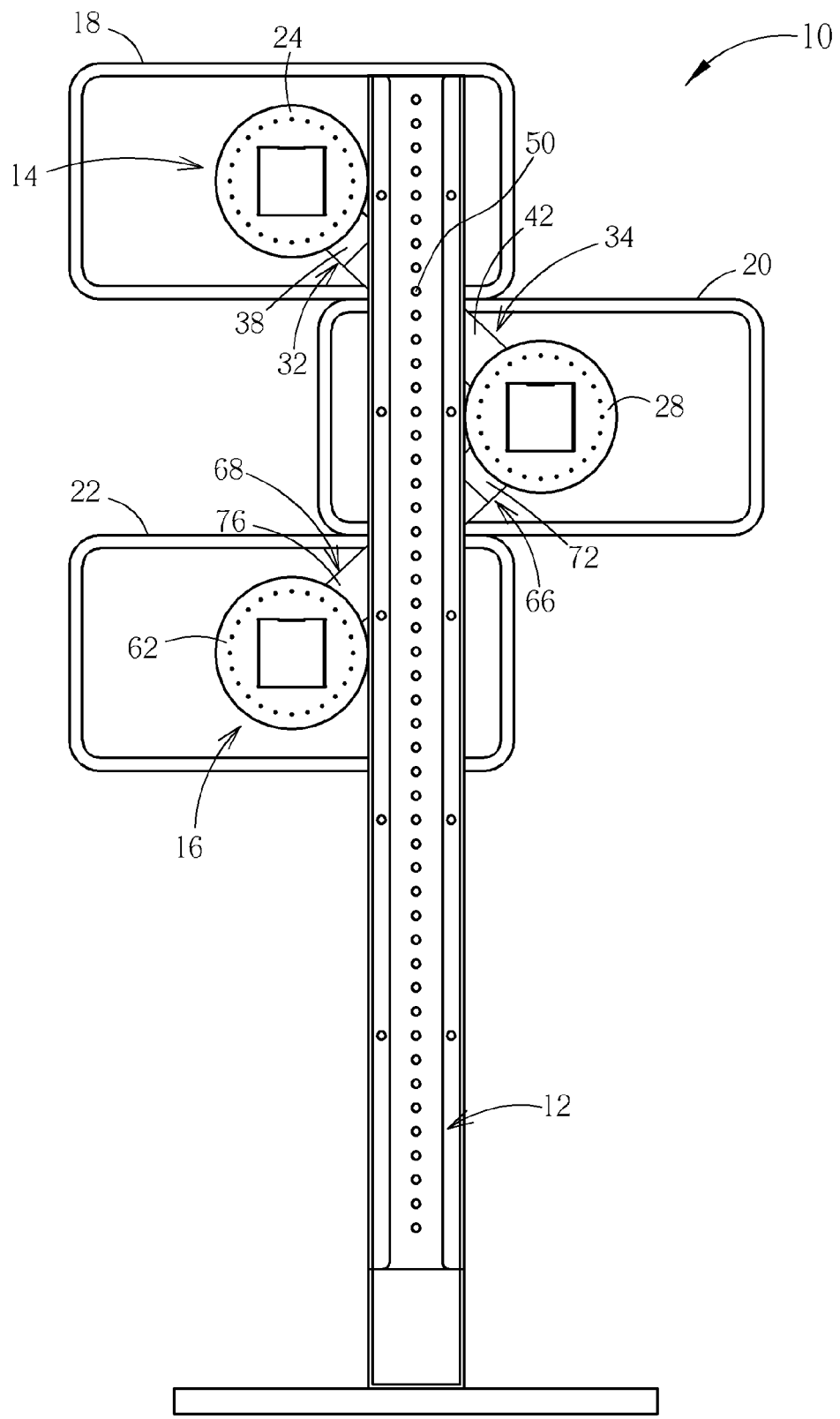
FIG. 1 is a rear view of a hanging module according to an embodiment of the present invention.

Please refer to FIG. 1, which is a rear view of a hanging module 10 according to an embodiment of the present invention. As shown in FIG. 1, the hanging module 10 includes a hanging frame 12, a first hanging mechanism 14, and at least one second hanging mechanism 16 (one shown in FIG. 1). The first hanging mechanism 14 is connected to the second hanging mechanism 16. A first display monitor 18 and a second display monitor 20 are disposed on the first hanging mechanism 14 respectively. A third display monitor 22 is disposed on the second hanging mechanism 16, and the hanging frame 12 is connected to the first hanging mechanism 14 and the second hanging mechanism 16 for hanging the first display monitor 18, the second display monitor 20, and the third display monitor 22. In the present invention, the first display monitor 18, the second display monitor 20, and the third display monitor 22 are regarded as one example of a displayer, but not limited thereto, meaning that the present invention can also utilize the hanging module 10 to hang other type of displayer. The hanging frame 12 can be a conventional upright frame, and the related description for its structural design is omitted herein since it is commonly seen in the prior art. In the following, more detailed description for the first hanging mechanism 14 and the second hanging mechanism 16 is provided.

Figure 2:
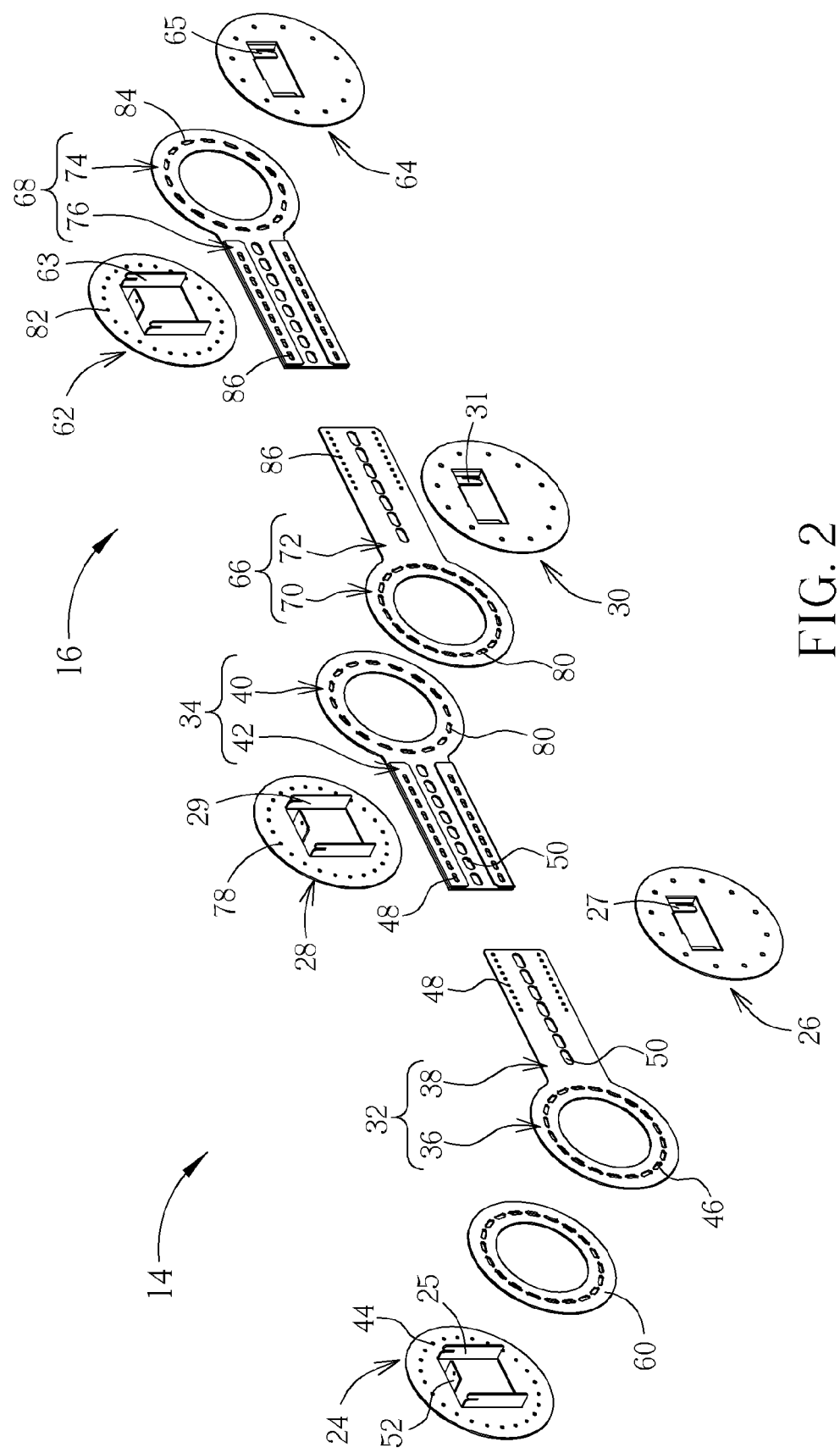
FIG. 2 is an exploded diagram of a first hanging mechanism and a second hanging mechanism in FIG. 1.

For the mechanical design of the first hanging mechanism 14, please refer to FIG. 1 and FIG. 2. FIG. 2 is an exploded diagram of the first hanging mechanism 14 and the second hanging mechanism 16 in FIG. 1. As shown in FIG. 2, the first hanging mechanism 14 includes a first slot disk 24, a first hook disk 26, a second slot disk 28, a second hook disk 30, a first sliding member 32, and a first guiding member 34. The first hook disk 26 is detachably disposed on the first display monitor 18. The first hook disk 26 has at least one first hook 27 (two shown in FIG. 2), and the first slot disk 24 has at least one first protruding slot 25 correspondingly (two shown in FIG. 2). The first hook 27 is used for hooking the first protruding slot 25 so that the first hook disk 26 can be hung on the first slot disk 24. The second hook disk 30 has at least one second hook 31 (two shown in FIG. 2), and the second slot disk 28 has at least one second protruding slot 29 correspondingly (two shown in FIG. 2). The second hook 31 is used for hooking the second protruding slot 29 so that the second hook disk 30 can be hung on the second slot disk 28.

The first sliding member 32 has a first pivot portion 36 and a first rod portion 38. The first pivot portion 36 is pivotally connected to the first protruding slot 25. The first guiding member 34 has a second pivot portion 40 and a first slot portion 42. The second pivot portion 40 is pivotally connected to the second protruding slot 29. The first rod portion 38 is slidably disposed in the first slot portion 42 so that a length of the first sliding member 32 relative to the first guiding member 34 can be adjustable.

The fixing design of each component on the first hanging mechanism 14 is as shown in FIG. 2. A plurality of first screw holes 44 is formed on the first slot disk 24, and a plurality of angle fixing holes 46 is correspondingly formed on the first pivot portion 36. Accordingly, the first pivot portion 36 can be fixed onto the first slot disk 24 by screwing at least one of the plurality of angle fixing holes 46 and the corresponding first screw hole 44 for fixing an angle of the first sliding member 32 relative to the first slot disk 24. In other words, the angle of the first sliding member 32 relative to the first slot disk 24 can be adjusted via one first screw hole 44 cooperating with different angle fixing hole 46.

Furthermore, a plurality of length fixing holes 48 is formed on the first slot portion 42 and the first rod portion 38 respectively. Accordingly, the first guiding member 34 can be fixed onto the first sliding member 32 by screwing at least one of the plurality of length fixing holes 48 on the first slot portion 42 and the corresponding length fixing hole 48 on the first rod portion 38, for fixing a length of the first sliding member 32 relative to the first guiding member 34. That is, the length of the first sliding member 32 relative to the first guiding member 34 can be adjusted via one length fixing hole 48 on the first slot portion 42 cooperating with different length fixing holes 48 on the first rod portion 38.

As for the fixing designs of the first sliding member 32, the first guiding member 34 and the hanging frame 12, the related description is provided as follows. In this embodiment, a plurality of second screw holes 50 is formed on the first slot portion 42, the first rod portion 38, and the hanging frame 12 respectively. Accordingly, the first sliding member 32 and the first guiding member 34 can be fixed onto the hanging frame 12 by screwing one of the plurality of second screw holes 50 on the first slot portion 42, the corresponding second screw hole 50 on the first rod portion 38 and the corresponding second screw hole 50 on the hanging frame 12.

In practical application, for improving the hooking strength of the first hook disk 26 and the first slot disk 24, the first slot disk 24 and the first hook disk 26 have a protruding piece 52 respectively (as shown in FIG. 2). In such a manner, the protruding piece 52 of the first hook disk 26 can be laminated on the protruding piece 52 of the first slot disk 24, and then they can be fixed to each other in a screw locking manner so that the first hook disk 26 can be hung on the first slot disk 24 more steadily.

Figure 3:
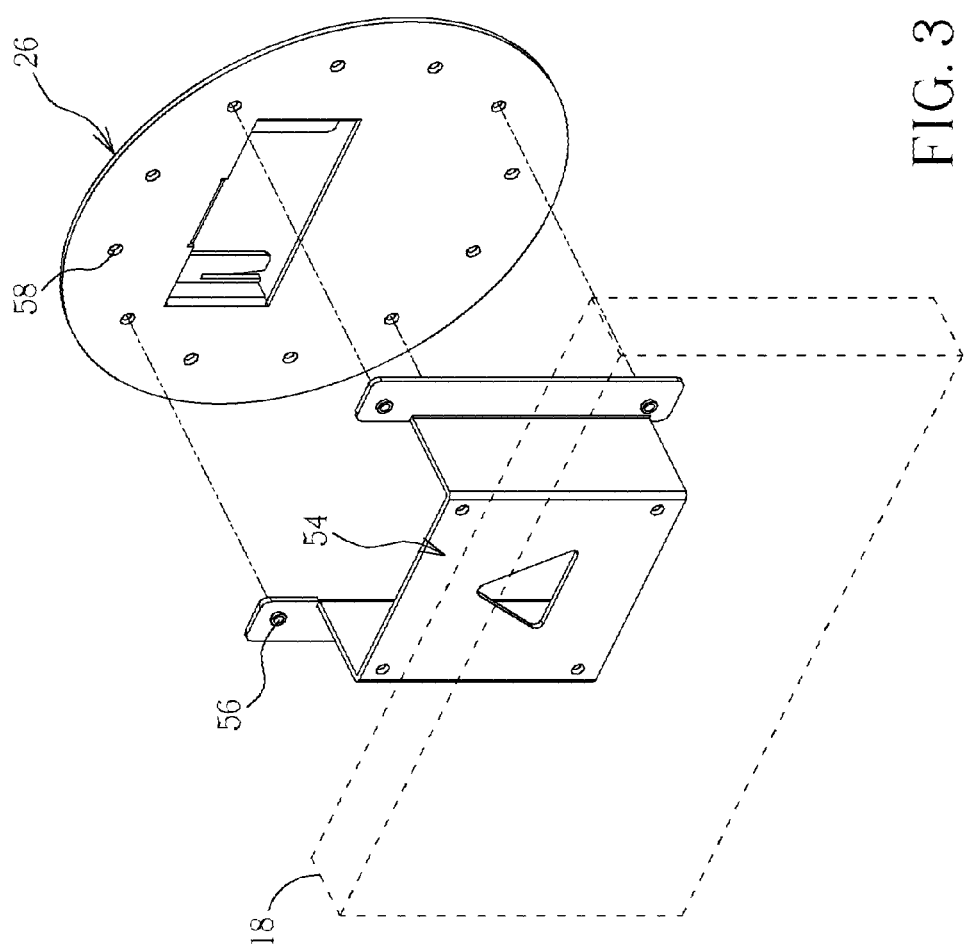
FIG. 3 is an exploded diagram of a first hook disk and a first display monitor in FIG. 2.

Furthermore, please refer to FIG. 3, which is an exploded diagram of the first hook disk 26 and the first display monitor 18 (briefly depicted by dotted lines in FIG. 3) in FIG. 2. As shown in FIG. 3, the first hanging mechanism 14 further includes a connecting member 54. In this embodiment, a plurality of third screw holes 56 is formed on the connecting member 54. A plurality of angle fixing holes 58 is formed on the first hook disk 26. Accordingly, the connecting member 54 can be fixed onto the first hook disk 26 by screwing the plurality of the third screw holes 56 and the corresponding angle fixing holes 58, for fixing an angle of the connecting member 54 relative to the first hook disk 26. Subsequently, after the connecting member 54 is fixed onto the first display monitor 18 in a screw locking manner, the first display monitor 18 can be fixed onto the first hook disk 26 and have an angle adjusting function accordingly. That is, an angle of the first display monitor 18 relative to the first hook disk 26 can be adjusted via the plurality of third screw holes 56 on the connecting member 54 cooperating with different angle fixing holes 58 on the first hook disk 26. The aforementioned design that the connecting member 54 is connected to the first display monitor 18 and the first hook disk 26 can also be applied to the second display monitor 20 and the third display monitor 22.

As mentioned above, the first sliding member 32 is slidably laminated on the first guiding member 34. Thus, for making the first display monitor 18 and the second display monitor 20 located on the same horizontal surface, the first hanging mechanism 14 further includes a washer disk 60. The washer disk 60 is disposed between the first slot disk 24 and the first sliding member 32. Accordingly, via thickness compensation of the washer disk 60 between the first slot disk 24 and the first sliding member 32, the first display monitor 18 and the second display monitor 20 can be aligned with each other to be located on the same horizontal surface when the first display monitor 18 and the second display monitor 20 are disposed on the first hanging mechanism 14. Thus, the hanging module 10 can have a compact look.

In the aspect of the mechanical design of the second hanging mechanism 16, as shown in FIG. 1 and FIG. 2, the second hanging mechanism 16 includes a third slot disk 62, a third hook disk 64, a second sliding member 66, and a second guiding member 68. The third hook disk 64 is detachably disposed on the third display monitor 22. The third hook disk 64 has at least one third hook 65 (two shown in FIG. 2), and the third slot disk 62 has at least one third protruding slot 63 correspondingly (two shown in FIG. 2). The third hook 65 is used for hooking the third protruding slot 63. The second sliding member 66 has a third pivot portion 70 and a second rod portion 72. The third pivot portion 70 is pivotally connected to the second protruding slot 29. The second guiding member 68 has a fourth pivot portion 74 and a second slot portion 76. The fourth pivot portion 74 is pivotally connected to the third protruding slot 63. The second rod portion 72 is slidably disposed in the second slot portion 76 so that a length of the second sliding member 66 relative to the second guiding member 68 can be adjustable.

To be more specific, as shown in FIG. 2, a plurality of fourth screw holes 78 is formed on the second slot disk 28, and a plurality of angle fixing holes 80 is formed on the second pivot portion 40 and the third pivot portion 70 respectively. Accordingly, the second pivot portion 40 and the third pivot portion 70 can be fixed onto the second slot disk 28 by screwing at least one of the plurality of fourth screw holes 78 and the corresponding angle fixing hole 80 for fixing an angle of the second slot disk 28 relative to the first guiding member 34 and the second sliding member 66. In other words, the angle of the second slot disk 28 relative to the first guiding member 34 and the second sliding member 66 can be adjusted via one fourth screw hole 78 cooperating with different angle fixing holes 80.

Furthermore, a plurality of fifth screw holes 82 is formed on the third slot disk 62, and a plurality of angle fixing holes 84 is correspondingly formed on the fourth pivot portion 74. Accordingly, the fourth pivot portion 74 can be fixed onto the third slot disk 62 by screwing at least one of the plurality of angle fixing holes 84 and the corresponding fifth screw hole 82 for fixing an angle of the third slot disk 62 relative to the second guiding member 68. In other words, the angle of the third slot disk 62 relative to the second guiding member 68 can be adjusted via one fifth screw hole 82 cooperating with different angle fixing holes 84.

Furthermore, a plurality of length fixing holes 86 is formed on the second slot portion 76 and the second rod portion 72 respectively. Accordingly, the second guiding member 68 can be fixed onto the second sliding member 66 by screwing one of the plurality of length fixing holes 86 on the second slot portion 76 and the corresponding length fixing hole 86 on the second rod portion 72, for fixing a length of the second sliding member 66 relative to the second guiding member 68. That is, the length of the second sliding member 66 relative to the second guiding member 68 can be adjusted via one length fixing hole 86 on the second slot portion 76 cooperating with different length fixing holes 86 on the second rod portion 72.

As for the fixing designs of the second sliding member 66, the second guiding member 68 and the hanging frame 12, they can be reasoned according to the said mechanical design of the first hanging mechanism 14 and therefore omitted herein. Furthermore, the said design for improving the hooking strength of the said hook disk and the said slot disk by the said protruding piece can also be applied to hooking of the second hook disk 30 on the second slot disk 28 and hooking of the third hook disk 64 on the third slot disk 62.

More detailed description for assembly and hanging operations of the hanging module 10 is provided as follows. Please refer to FIGS. 1-3. When a user wants to hang the first display monitor 18, the second display monitor 20, and the third display monitor 22 on the hanging frame 12, the user just needs to utilize the connecting member 54 to fix the first display monitor 18 onto the first hook disk 26 (as shown in FIG. 3), and then screw the first sliding member 32 onto the first slot disk 24 via the first pivot portion 36 at the relative angle as shown in FIG. 1. Subsequently, based on the said steps, the user can screw the second display monitor 20 and the third display monitor 22 onto the second hook disk 30 and the third hook disk 64 respectively, and then screw the first guiding member 34 and the second sliding member 66 onto the second slot disk 28 at the relative angle as shown in FIG. 1 and screw the second guiding member 68 onto the third slot disk 62 at the relative angle as shown in FIG. 1.

After the said assembly is completed, the user can screw the first sliding member 32 onto the first guiding member 34 via the first rod portion 38 cooperating with the first slot portion 42 in the relative length as shown in FIG. 1 and screw the second sliding member 66 onto the second guiding member 68 via the second rod portion 72 cooperating with the second slot portion 76 in the relative length as shown in FIG. 1 sequentially. Subsequently, the user can screw the first sliding member 32 and the first guiding member 34 with the fixed length and the second sliding member 66 and the second guiding member 68 with the fixed length onto the hanging frame 12 respectively. Finally, after the first display monitor 18, the second display monitor 20, and the third display monitor 22 are hung on the first slot disk 24, the second slot disk 28, and the third slot disk 64 via the first hook disk 26, the second hook disk 30, and the third hook disk 64 respectively, the first display monitor 18, the second display monitor 20, and the third display monitor 22 can be hung on the hanging frame 12 as shown in FIG. 1, so as to complete the assembly and hanging operations of the hanging module 10.

Figure 4:
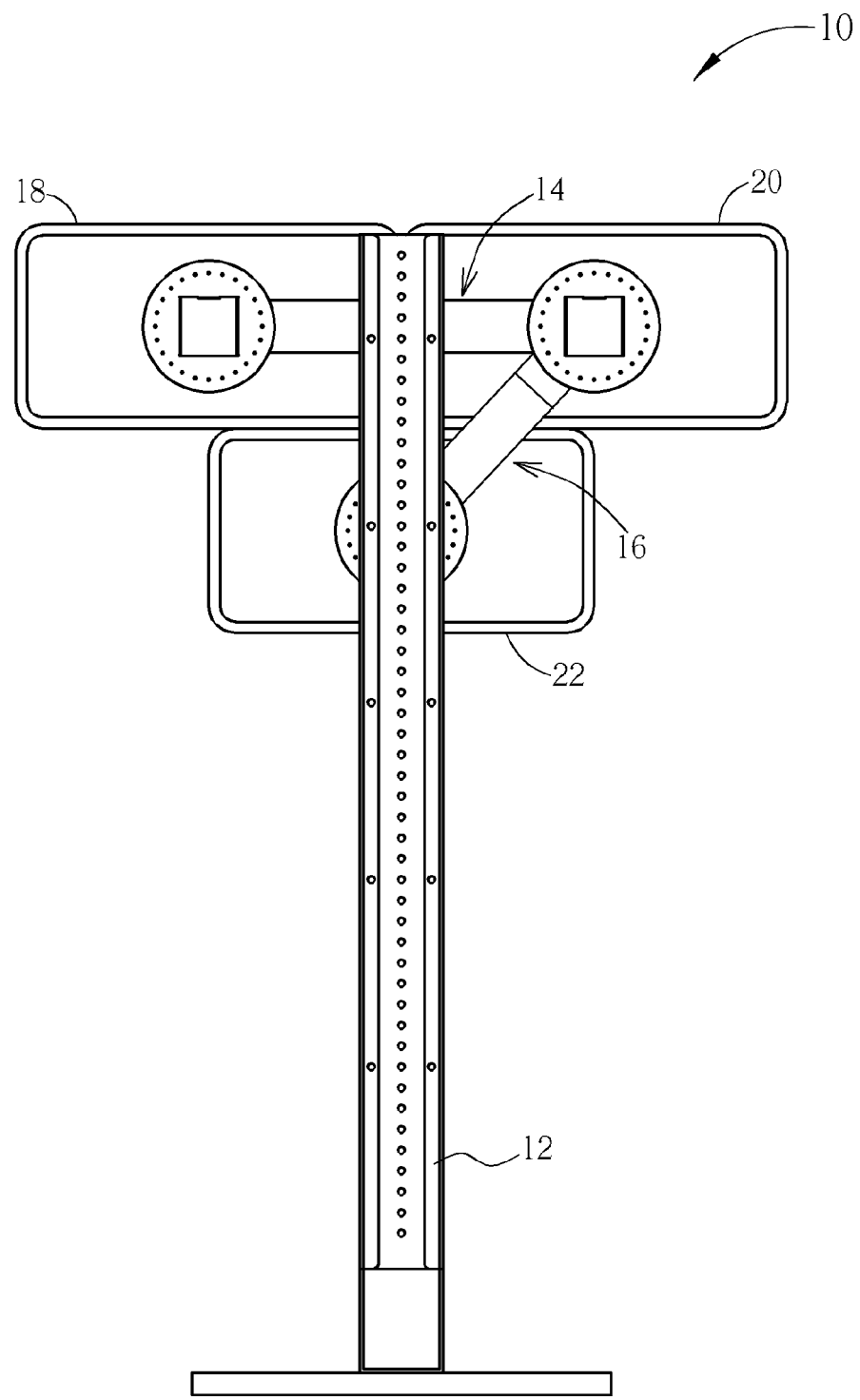
FIG. 4 is a rear view of a first display monitor, a second display monitor, and a third display monitor on the hanging module in FIG. 1 in another configuration.

It should be mentioned that the configuration of the first display monitor 18, the second display monitor 20, and the third display monitor 22 on the hanging frame 12 is not limited to FIG. 1. That is, via the said design that the said sliding member can be telescopically and pivotally connected to the corresponding guiding member, the configuration of the first display monitor 18, the second display monitor 20, and the third display monitor 22 on the hanging frame 12 is adjustable. For example, the first display monitor 18 can be moved from the position located above the second display monitor 20 to the position located at the left side of the second display monitor 20 via sliding of the first rod portion 38 relative to the first slot portion 42, rotation of the first sliding member 32 relative to the first slot disk 24, and rotation of the first guiding member 34 relative to the second slot disk 28. Accordingly, the configuration of the first display monitor 18, the second display monitor 20, and the third display monitor 22 on the hanging frame 12 can be changed to the configuration as shown in FIG. 4, which is a rear view of the first display monitor 18, the second display monitor 20, and the third display monitor 22 on the hanging frame 12 in FIG. 1 in another configuration. As for other derivative configurations, they can be reasoned according to the said embodiment and the related description is omitted herein.

Furthermore, the hanging frame 12, the second hanging mechanism 16, the connecting member 54, and the washer disk 60 can be an omissible component for simplifying the mechanical design of the hanging module 10. For example, the hanging module 10 can hang the first display monitor 18, the second display monitor 20, and the third display monitor 22 on a support wall instead of the hanging frame 12 by screwing the first sliding member 32 and the first sliding member 34 onto the support wall; otherwise, the hanging module 10 can only have the first hanging mechanism 14 disposed thereon for hanging two display monitors. Furthermore, the hanging module provided by the present invention is not limited to be applied to connection of the first hanging mechanism and one single second hanging mechanism. In practical application, the present invention can utilize more than one second hanging mechanism to connect to the first hanging mechanism in serial connection, for achieving the purpose that there can be more than three display monitors on the hanging module, as well as the configuration of the first display monitor and plural second display monitors on the hanging module can be more flexible via the design that the said sliding member and the said guiding member is telescopically and pivotally connected to the said slot disk.

Compared with the prior art, the present invention utilizes the design that the display monitor can be hung on the hanging module by hooking of the hook disk on the slot disk and the design that the sliding member and the guiding member are telescopically and pivotally connected to the slot disk, to make the hanging module have an angle adjusting function and a length adjusting function. Furthermore, the present invention can also utilize more than one second hanging mechanism to connect to the first hanging mechanism in serial connection for achieving the purpose that there can be more than three display monitors on the hanging module. Thus, configuration flexibility of the hanging module provided by the present invention is increased greatly in hanging plural display monitors.

Those skilled in the art will readily observe that numerous modifications and alterations of the device and method may be made while retaining the teachings of the invention.

What is claimed is:

1. A hanging module for hanging a first displayer, a second displayer, and a third displayer, the hanging module comprising: a first hanging mechanism comprising:
   a first slot disk having at least one first protruding slot;
   a first hook disk detachably disposed on the first displayer and having at least one first hook, the first hook being engaged with the first protruding slot for fixing the first hook disk on the first slot disk;
   a second slot disk having at least one second protruding slot;
   a second hook disk detachably disposed on the second displayer and having at least one second hook, the second hook being engaged with the second protruding slot for fixing the second hook disk on the second slot disk;
   a first sliding member having a first pivot portion and a first rod portion, the first pivot portion being pivotally connected to the first protruding slot to make the first sliding member located between the first hook disk and the first slot disk when the first pivot portion is rotatably mounted on but not fixed on the first slot disk so that assembly of the first slot disk and the first hook disk pivots freely in 360 degrees relative to the first sliding member for adjusting an angle of the first sliding member relative to the first slot disk; and
   a first guiding member having a second pivot portion and a first slot portion, the second pivot portion being pivotally connected to the second protruding slot, the first rod portion being slidably disposed in the first slot portion for adjusting a length of the first sliding member relative to the first guiding member; and
at least one second hanging mechanism connected to the first hanging mechanism, the second hanging mechanism comprising:
   a third slot disk having at least one third protruding slot;

a third hook disk detachably disposed on the third displayer and having at least one third hook for hooking the third protruding slot;

a second sliding member having a third pivot portion and a second rod portion, the third pivot portion being pivotally connected to the second protruding slot; and a second guiding member having a fourth pivot portion and a second slot portion, the fourth pivot portion being pivotally connected to the third protruding slot the second rod portion being slidably disposed in the second slot portion for adjusting a length of the second sliding member relative to the second guiding member.

2. The hanging module of claim 1, wherein a plurality of screw holes is formed on the first slot disk, a plurality of angle fixing holes is correspondingly formed on the first pivot portion, and the first pivot portion is fixed onto the first slot disk by screwing at least one of the plurality of angle fixing holes and the corresponding screw hole, for fixing an angle of the first sliding member relative to the first slot disk.

3. The hanging module of claim 2, wherein a plurality of screw holes is formed on the second slot disk, a plurality of angle fixing holes is correspondingly formed on the second pivot portion, and the second pivot portion is fixed onto the second slot disk by screwing at least one of the plurality of angle fixing holes and the corresponding screw hole, for fixing an angle of the first guiding member relative to the second slot disk.

4. The hanging module of claim 1, wherein a plurality of length fixing holes is formed on the first slot portion and the first rod portion respectively, and the first guiding member is fixed onto the first sliding member by screwing one of the plurality of length fixing holes on the first slot portion and the corresponding length fixing hole on the first rod portion, for fixing a length of the first sliding member relative to the first guiding member.

5. The hanging module of claim 1, wherein a plurality of screw holes is formed on the first slot portion and the first rod portion respectively, and the first sliding member and the first guiding member are fixed onto a support wall by screwing one of the plurality of screw holes on the first slot portion and the corresponding screw hole on the first rod portion, for hanging the first displayer and the second displayer on the support wall.

6. The hanging module of claim 1, wherein the first slot disk and the first hook disk have a protruding piece respectively, and the protruding piece of the first hook disk is fixed onto the protruding piece of the first slot disk in a screw locking manner when the first hook is hung on the first protruding slot.

7. The hanging module of claim 1, wherein the first hanging mechanism further comprises:

a connecting member connected to the first hook disk and the first displayer for fixing the first hook disk onto the first displayer.

8. The hanging module of claim 7, wherein a plurality of screw holes is formed on the connecting member, a plurality of angle fixing holes is formed on the first hook disk, and the connecting member is fixed onto the first hook disk by screwing the plurality of screw holes and the corresponding angle fixing holes, for fixing an angle of the connecting member relative to the first hook disk.

9. The hanging module of claim 7, wherein the connecting member is fixed onto the first displayer in a screw locking manner.

10. The hanging module of claim 1, wherein the first hanging mechanism further comprises:

a washer disk disposed between the first slot disk and the first sliding member.

11. The hanging module of claim 1, wherein a plurality of screw holes is formed on the second slot disk, a plurality of angle fixing holes is formed on the second pivot portion and the third pivot portion respectively, and the second pivot portion and the third pivot portion are fixed onto the second slot disk by screwing at least one of the plurality of screw holes and the corresponding angle fixing holes, for fixing an angle of the second slot disk relative to the first guiding member and the second sliding member.

12. The hanging module of claim 11, wherein a plurality of screw holes is formed on the third slot disk, a plurality of angle fixing holes is correspondingly formed on the fourth pivot portion, and the fourth pivot portion is fixed onto the third slot disk by screwing at least one of the plurality of angle fixing holes and the corresponding screw hole, for fixing an angle of the second guiding member relative to the third slot disk.

13. The hanging module of claim 1, wherein a plurality of screw holes is formed on the third slot disk, a plurality of angle fixing holes is correspondingly formed on the fourth pivot portion, and the fourth pivot portion is fixed onto the third slot disk by screwing at least one of the plurality of angle fixing holes and the corresponding screw hole, for fixing an angle of the second guiding member relative to the third slot disk.

14. The hanging module of claim 1, wherein a plurality of length fixing holes is formed on the second slot portion and the second rod portion respectively, and the second guiding member is fixed onto the second sliding member by screwing one of the plurality of length fixing holes on the second slot portion and the corresponding length fixing hole on the second rod portion, for fixing a length of the second sliding member relative to the second guiding member.

15. The hanging module of claim 1 further comprises:

a hanging frame connected to the first hanging mechanism and the second hanging mechanism, for hanging the first displayer, the second displayer, and the third displayer.

16. The hanging module of claim 15, wherein a plurality of screw holes is formed on the first slot portion, the first rod portion, and the hanging frame respectively, and the first sliding member and the first guiding member are fixed onto the hanging frame by screwing one of the plurality of screw holes on the first slot portion, the corresponding screw hole on the first rod portion, and the corresponding screw hole on the hanging frame.

* * * * *